Aug. 22, 1967  J. R. WOOD  3,336,675
ANGLE AND TAPER GAUGING ASSEMBLY
Filed June 3, 1965  2 Sheets-Sheet 1
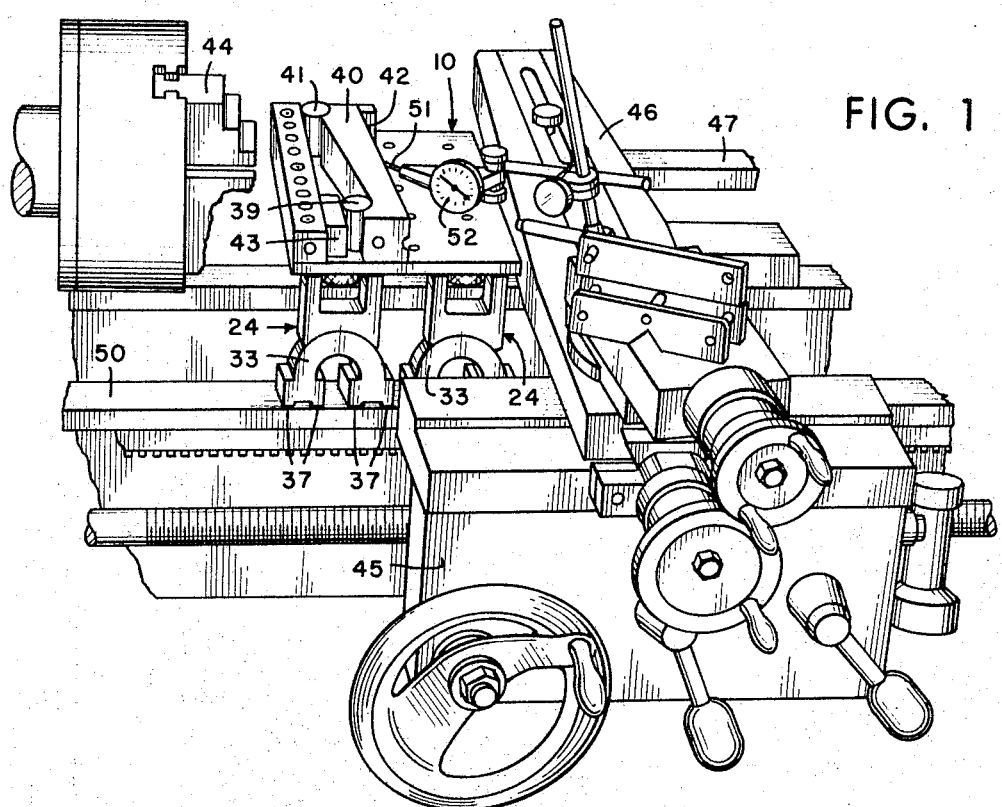
FIG. 1
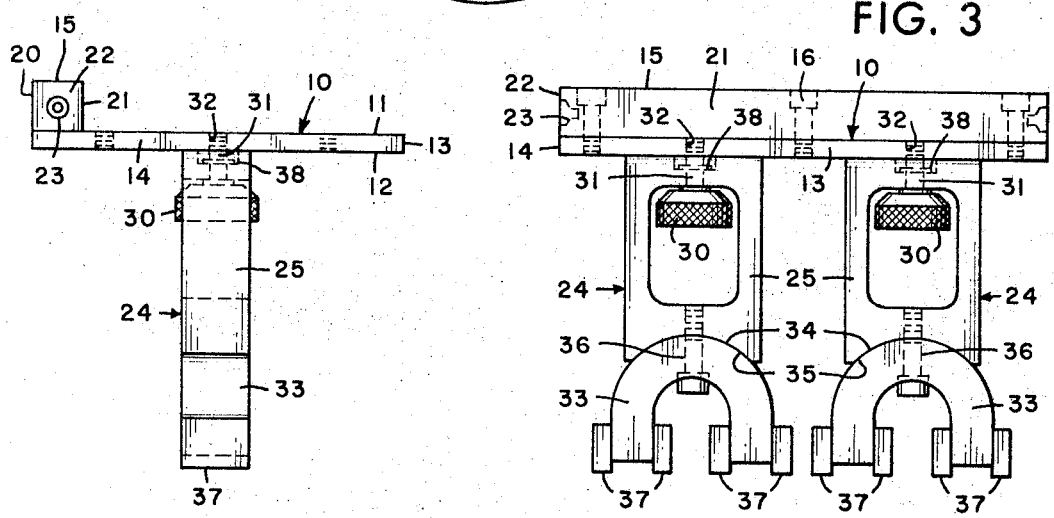
FIG. 2
FIG. 3
INVENTOR
JAMES R. WOOD
BY
Cohn and Powell
ATTORNEYS Aug. 22, 1967  J. R. WOOD  3,336,675
ANGLE AND TAPER GAUGING ASSEMBLY
Filed June 3, 1965  2 Sheets-Sheet 2

INVENTOR
JAMES R. WOOD
BY
*Cohn and Powell*
ATTORNEYS

United States Patent Office 3,336,675
Patented Aug. 22, 1967

3,336,675
ANGLE AND TAPER GAUGING ASSEMBLY
James R. Wood, 313 N. Anderson St.,
Tullahoma, Tenn. 37388
Filed June 3, 1965, Ser. No. 460,902
9 Claims. (Cl. 33—174)

ABSTRACT OF THE DISCLOSURE

A supporting stand for a gauge, the stand including a flat rectangular plate having a machined rail along one edge. The edges of the plate are machined square. A pair of riser blocks having magnetic feet, are adjustably attached to the underside of the plate, and the feet, which have flat faces, are supported on one of the ways of a lathe or similar machine in connection with which the gauge is to be used. The stand provides a raised, supporting platform and an aligned rail which, when used in conjunction with a sine bar or similar gauge provides an accurate setting-up device for a workpiece preparatory to machining.

---

This invention relates generally to improvements in an angle and taper gauging assembly, and more particularly to a support for a sine bar which is especially adapted for use with many different machines for making accurate angle settings.

A lathe permits taper turning by the well known use of the compound cross slide or the taper attachment, and by the conventional step of moving the tailstock off the center line. This is a fine device for generating tapers and is only limited in its accuracy by the ability of the operator to set it up exactly. To set up a lathe to cut an ultra precision taper can be done only by trial and error. For example, parts are carried to optical comparators and continued adjustments made until desired results are obtained.

There are two conventional devices currently marketed to make angular adjustments more practical. The first device is a 5″ sine bar pivotally mounted to a rod having built-in centers at its ends. The device is designed primarily for work between machine centers, and has a limited use, obviously. The second device is a non-standard length (2½″) sine bar pivotally mounted to a magnetic base that is adapted to adhere directly to the workpiece. Again, this device has limited use and accuracy. The base will not hold to non-ferrous material; the sine bar is set with micrometers, and the non-standard length creates problems of interpolation of angular sine tables.

It is an important object of the present invention to provide a device that supports and readily orients a conventional 5″ sine bar in setting up tapers and angles on metal turning lathes, cylindrical grinding machines, milling machines and other machine tools.

An important object is achieved by the provision of a sine bar support that includes a rail on a plate, the rail having an accurately machined surface against which the sine bar bears for orientation as the sine bar is supported on the plate, and means carried by the plate for readily aligning the plate parallel to the work axis of the machine.

Another important object is realized by the provision of a flat face on the plate on which the sine bar rests, and by the provision of at least one mounting magnet carried by the plate, the magnet having a flat face parallel to the plate face and adapted to seat on a flat way parallel to the machine work axis, whereby the plate face is aligned automatically parallel to the same machine work axis.

Still another important object is attained by the structural arrangement in which the magnet is adjustably mounted to the flat way so that the rail surface can be adjustably moved to a position selectively in either longitudinal parallel alignment with or perpendicularly parallel to the machine work axis, and thereby enable the sine bar to be accurately oriented in order for the machine to be indicated in to provide the precise taper.

An important object is afforded in that in a lathe, the magnet is seated on a flat way adjacent the carriage which places the plate face automatically parallel to the center line of the lathe bed, the rail surface being adjustable upon shifting of the magnet position to place the rail surface selectively in either parallel longitudinal alignment with or perpendicularly parallel to the center line by indicating such rail surface as the carriage or the compound cross slide respectively is moved back and forth with the indicator attached and with the indicator point riding on the rail surface. After the sine bar is set up on the plate and against the rail surface for the desired angle or taper, the taper attachment or cross slide is indicated to the sine bar.

Another important object is achieved by the provision of at least one side margin on the plate that is either parallel or perpendicular to the rail surface, and accordingly, is adapted for use to indicate in the rail surface precisely relative to the machine work axis.

Yet another important object is realized by providing a sine bar support that can be used without removing the workpiece from the lathe or without attachment to the workpiece, and which does not require any external clamping or holding devices. Other advantages are provided in that the sine bar support establishes an ideally situated precision platform from which the lathe cutter bit can be adjusted to absolute center height, an exacting requirement when doing angular or taper lathe turning.

An important object is attained by the unique structural arrangement of the magnetic blocks connected to the support plate which enables the blocks to accommodate a specific flat way in order to dispose the plate and rail at the desired location and angular position relative to the machine work axis.

Another important object is to provide a sine bar support that is simple and durable in construction, economical to manufacture and assemble, highly efficient in operation, and which can be readily utilized by any machinist with little or no instruction.

The foregoing and numerous other objects and advantages of the invention will more clearly appear from the following detailed description of a preferred embodiment, particularly when considered in connection with the accompanying drawings, in which:

FIG. 1 is a perspective view of the sine bar support on a lathe, the support and sine bar being disposed in position for setting up the lathe for a taper of greater than 45° from the center line of the lathe bed;

FIG. 2 is an end elevational view of the sine bar support;

FIG. 3 is a side elevational view of the sine bar support, and

Figure 4:
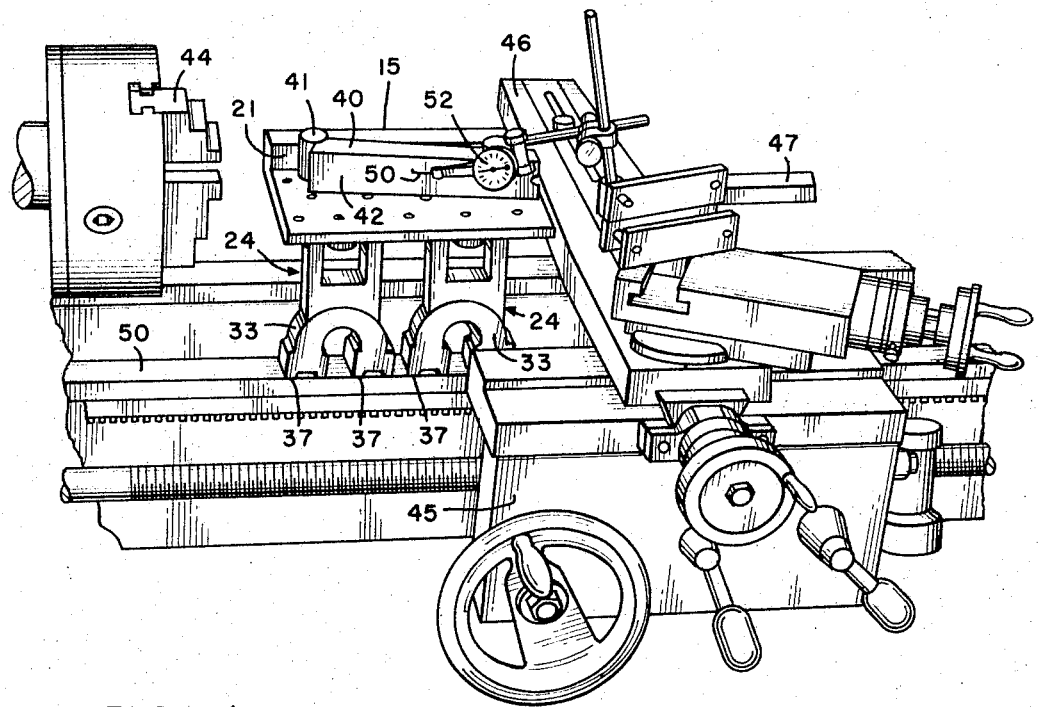
FIG. 4 is a perspective view similar to FIG. 1, but showing the sine bar support and sine bar disposed in position to set up the lathe for an angle of 45° or less relative to the center line of the lathe bed.

Referring now by characters of reference to the drawings, and first to FIGS. 2 and 3, it is seen that the sine bar support includes a plate generally indicated by 10 having an accurately machined and ground, flat upper face 11 and a corresponding flat bottom face 12. The plate 10 is exactly squared to provide two pair of opposed parallel side margins 13 and 14 respectively.

Disposed on the upper plate face 10 is a rail 15. The rail 15 extends across the plate 10 immediately adjacent one of the side margins 13. A plurality of screws 16 (a total of three screws in the embodiment disclosed) extend through the top of the rail 15 and threadedly engage the plate 10 to fix the rail 15 to the plate. The rail 15 includes an accurately machined outer surface 20 that is flush with the adjacent side margin 13. In addition, the rail 15 is provided with an accurately machined reference surface 21 that faces inwardly over the flat plate face 11 and which is parallel to the pair of side margins 13. It will be understood that the other pair of side margins 14 are perpendicular to the rail surface 21.

The ends 22 of the rail 15 terminate flush with the pair of opposed parallel side margins 14. Rail ends 22 are provided with accurately located center sockets 23 adapted to receive centering pins of a chuck head and tailstock of a cylindrical turning machine, as will be explained fully upon later description of parts, whereby to locate the rail reference surface 21 in exact parallel alignment with the machine work axis.

A pair of blocks referred to by 24 are detachably connected to and depend from the plate 10. The structure of the blocks 24 are identical so that a detailed description of one will suffice for the other.

The block 24 includes a leg 25 constructed of a nonmagnetic material, the leg 25 including a flat upper margin 26 contiguously engaging the bottom plate face 12. Formed in the center of leg 25 is an opening 27 in which adjustment knob 30 is located. The knob 30 is attached to the lower end of a threaded bolt 31 that is adapted to be threadedly engaged and received in any one of a plurality of compatible tapped holes 32 formed in the plate 10. A retaining ring 38 is carried by the shank of bolt 31 and engages a transverse web portion of the leg 25 to hold the bolt 31 and its knob 30 in assembly with the leg 25 when the bolt 31 is detached from the plate 10. Turning adjustment of the knob 30 causes threaded engagement of the bolt 31 in its selected tapped hole 32 so as to clamp the upper leg margin 26 tightly against the bottom plate face 12, and thereby fixes the block 24 securely to the plate 10 in the desired location and angular position.

The block 24 includes a magnet 33 of an inverted, substantially U-shape. The arcuate bight 34 of the magnet 33 conforms to the configuration of and seats against the arcuate lower margin 35 of leg 25. A cap screw 36 extends upwardly through the magnet bight 34 and threadedly engages the lower end of leg 25 to clamp the magnet 33 in any selected angular position.

The magnet 33 is provided with an accurately ground face 37 that is parallel to the accurately ground plate face 11, when the block 24 is fixed to the plate 10.

A conventional 5″ sine bar is referred to by 40, the sine bar 40 including a pair of accurately machined and ground cylinders 39 and 41 at one side of the bar. Cylinders 39 and 41 are located at the ends of the bar with their axes extending in parallel alignment. The opposite side of the bar 40 is provided with an accurately machined and ground reference surface 42.

To use the sine bar 40, the pivot cylinders 39 and 41 are placed against the rail reference surface 21 to which an angle is to be accurately determined or against some other surface accurately related in a known relationship to such work surface. One of the cylinders 41 acts as a pivot while the other cylinder 39 is moved away from the rail reference surface 21 a predetermined distance by the use of spacers such as Johannson gauge blocks 43, commonly called Jo-blocks. By using sine tables, and with the knowledge of the particular spacing provided by specific Jo-blocks 43 utilized, the angle of the bar reference surface 42 relative to the rail reference surface 21 can be accurately determined.

This taper and angle gauging assembly provided by the support and sine bar 40 can be advantageously utilized in a lathe as is shown in FIGS. 1 and 2. This lathe includes a head chuck 44, a reciprocatively movable carriage 45, a compound cross slide 46 carried by the carriage and a taper attachment 47 associated with the cross slide 46. The lathe bed defines a center line that constitutes a machine work axis. The lathe has a longitudinally extending, precisely ground, flat way 50 at one side of the lathe immediately adjacent the carriage 45. This flat way 50 is accurately machined to be precisely parallel to the center line of the lathe bed.

As will be readily understood, the sine bar 40 and the support therefor constituting the taper and angle gauging assembly can be utilized in other types of machines such as cylindrical grinding machines, milling machines and other machine tools having a defined machine work axis.

Referring first to FIG. 1, it will be assumed that it is desired to set up the lathe to turn a taper of from 45° to 90° relative to the center line of the lathe bed. In this instance, the blocks 24 are attached to the bottom face 12 of plate 10 in compatible threaded holes 32 near one of the side margins 14. The blocks 24 are disposed, as is shown in FIG. 1, relative to the plate 10 so that the magnet faces 37 are located just in front of the carriage 45 and so that the plate 10 is disposed just in front of the chuck 44. It will be importantly noted that the rail 15 and its ground rail reference surface 21 extend transversely to the center line of the lathe bed.

In FIG. 1, a pair of blocks 24 are used in side by side relation adjacent the same side plate margin 14. The blocks 24 are pivotally turned and fixed in the most advantageous position to seat the magnets 33 most effectively on the narrow lathe way 50.

First, this rail reference surface 21 is aligned accurately perpendicular to the center line of the lathe bed. This procedure is accomplished by placing the point 51 of an indicator 52 on the rail reference surface 21 and by adjustably moving the compound cross slide 46 in a direction precisely perpendicular to the lathe center line so that the indicator 52 indicates in the rail reference surface 21 precisely as the point 51 rides along such reference surface 21. The position of the rail reference surface 21 can be adjusted simply, during this alignment or indicating in procedure, by bumping the magnets 33 slightly so as to adjust the position of the magnet faces 37 on the flat bed way 50.

"Indicating in" is an expression commonly used in the machinist's trade to define the process of placing one point (or line or surface) in proximity with another point (or line or surface) such that they bear a predetermined spacial relationship with each other. When this predetermined relationship is achieved the points (or lines or surfaces) are "indicated in." The process is often performed by using a dial indicator, hence its name.

As an example in the present application, when the rail surface 21 is lined up to be truly perpendicular to the centerline of the lathe bed the rail surface 21 is "indicated in" with respect to that center-line.

It will be further understood that any one of the side margins 13 or 14 of the plate 10 can be utilized to indicate in the rail reference surface 21 in exactly the same manner. For example, the indicator point 51 could be placed on the front plate margin 13 and the cross slide 46 moved to run the indicator point 51 along such side margin 13. This side margin 13 is then indicated in exactly perpendicular to the lathe center line by bumping the magnets 33 slightly on the flat way 50 as described previously. In view of the fact that this side margin 13 is exactly parallel to the rail reference surface 21, the rail reference surface 21 is indicated in precisely also. If one of the other plate margins 14 is utilized to indicate in the rail reference surface 21, the carriage 45 is moved to run the indicator point 51 along such side margin 14. Again, the position of the plate 10 is adjusted by bumping the magnets 33 to adjust the position of the magnet faces 37 on the flat way 50. After the plate margin is indicated in precise parallel alignment to the center line of the lathe bed, the rail reference surface 21 is consequently indicated in precisely perpendicular to such center line.

After the rail reference surface 21 is indicated in precisely perpendicular to the center line of the lathe bed, the sine bar 40 is placed on the top face 11 of the plate 10, with one cylinder 41 engaging the rail surface 21 and with the other cylinder 39 spaced from the rail reference surface 21 a predetermined distance by an appropriate number and size of Jo-blocks 43 in order to place the sine bar reference surface 42 in the desired angular relationship relative to the rail reference surface 21. This sine bar reference surface 42 is accordingly located in the desired angle of taper relative to the center line of the lathe bed.

The lathe is conditioned or set up for this taper by placing the indicator point 51 on the sine bar reference surface 42 and by moving the compound cross slide 46 and/or taper attachment 47 to run the indicator point 51 along such bar reference surface 42 and hence indicate in such bar reference surface 42. When the sine bar reference surface 42 is indicated in by appropriate adjustment of the compound cross slide 46 and/or by the taper attachment 47, the lathe is conditioned for the predetermined, desired taper.

FIG. 4 illustrates the lathe set up for a taper of 45° or less relative to the center line of the lathe bed. It will be noted that in this arrangement the blocks 24 are located in side by side relation immediately adjacent the plate margin 13 opposite the rail 15. The blocks 24 including the magnets 33 are arranged and pivotally adjusted so as to accommodate the narrow flat way 50 on the lathe so that the magnetic faces 37 of both magnets 33 seat on the way 50. When so disposed, the plate 10 is located immediately in front of the chuck 44 just ahead of the carriage 45. The rail reference surface 21 is located parallel to and generally in alignment with the center line of the lathe bed.

First, the rail reference surface 21 is accurately indicated in to place it precisely in parallel alignment with the center line. This result is provided by placing the indicator point 51 against the rail reference surface 21, and by moving the carriage 45 to run the indicator point 51 longitudinally along the rail reference surface 21. By bumping the magnets 33 slightly to adjust their relative positions on the flat lathe way 50, the rail reference surface 21 is indicated in precisely. As will be understood from the previous setup of FIG. 1, any one of the side plate margins 13 or 14 could be utilized in association with the indicator 52 to indicate in the rail reference surface 21 exactly.

Then, the sine bar 40 is placed on the top face 11 of plate 10 with one cylinder 41 engaging the rail reference surface 21 and with the other cylinder 39 spaced from the rail reference surface 21 by an appropriate number and size of Jo-blocks 43, whereby to place the bar reference surface 42 in the exact angular relationship relative to the rail reference surface 21 conforming to the angle or taper relative to the lathe center line at which the lathe is desired to be set. The indicator point 51 is placed on the sine bar reference surface 42 and the carriage 45 is moved to run the indicator point 51 along such sine bar reference surface 42 so that upon adjustment of the compound cross slide and/or taper attachment 47 and by reading the indicator 52, the sine bar reference surface 42 is indicated in so that the lathe is conditioned for turning the precise taper desired.

This sine bar support is a device that permits the use of an ordinary 5″ sine bar 40 in setting up taper attachments 47 and compound cross slides 46 on metal turning lathes for exacting angle work. The plate 10 establishes a platform, parallel to the center line of the lathe bed and at a convenient location and work height to permit setting up and indicating a 5″ sine bar 40 to make possible accurate angle settings. In use, the plate 10 with the blocks 24 are associated with the lathe with the magnets 33 placed on the longitudinal flat way 50 of the lathe. The magnets 33 on the blocks 24 hold the plate 10 firmly in place, parallel to the ways of the lathe, yet permit adjustable movement of the magnets 33 and hence of the plate 10 to align the plate 10, and especially the rail reference surface 21, precisely in a predetermined relationship to the center line of the lathe bed; such condition being a prerequisite to setting the sine bar 40 to the rail reference surface 21. After the plate 10, and hence the rail reference surface 21, is indicated in, the 5″ sine bar 40 is set up for the desired angle or taper in the conventional manner and the taper attachment or cross slide 46 is indicated to the sine bar reference surface 42.

Under some circumstances, the blocks 24 can be removed from the plate 10 and the rail 15 can be attached to and between the lathe chuck 44 and tailstock (not shown) by connection with the centers 23 provided at the rail ends 22. The rail reference surface 21 is indicated in precisely to the center line of the lathe by moving the carriage 45 which carries the indicator 52, the tailstock being adjustable for this purpose. After the rail reference surface 21 has been indicated in, the sine bar 40 is placed on or attached to the plate 10 in the conventional manner described previously, and the sine bar 40 is set up for the desired angle or taper and the taper attachment 47 or cross slide 46 is indicated to the sine bar reference surface 21.

Although the invention has been described by making detailed reference to a preferred embodiment, such detail is to be understood in an instructive, rather than in any restrictive sense, many variants being possible within the scope of the claims hereunto appended.

I claim as my invention:

1. A sine bar support, for a machine having a way, comprising:
   (a) a plate having a flat face parallel to the travel axis of the way,
   (b) a rail on the plate providing a machined surface against which a sine bar bears for orientation, relative to the travel axis of the way, while disposed on the plate face, and
   (c) a block attached to the plate and spacing the plate from the way, the block including a magnet having a face adapted to adjustably seat on the way, the block providing adjustment means for the plate relative to the way.

2. A sine bar support, for a machine having a way, comprising:
   (a) a plate having a flat face parallel to the travel axis of the way,
   (b) a rail on the plate providing a machined surface against which a sine bar bears for orientation relative to the travel axis of the way while located on the plate face,
   (c) the plate having at least one side margin parallel or perpendicular to the rail surface and adapted to be used to indicate in the rail surface, and
   (d) a block attached to the plate and spacing the plate from the way, the block including a magnet having a face adapted to adjustably seat on the way, the block providing adjustment means for the plate relative to the way.

3. A sine bar support, for a machine having a way, comprising:
   (a) a plate having a flat face parallel to the travel axis of the way,
   (b) a rail on the plate providing a machined surface against which a sine bar bears for orientation, relative to the travel axis of the way, while located on the plate face,
   (c) the plate being squared with two pair of opposed parallel side margins, the rail surface being parallel to one pair of parallel side margins and perpendicular to the other pair, any one of said side margins being adapted for use to indicate in the rail surface, and
   (d) a block attached to the plate and spacing the plate from the way, the block including a magnet having a face adapted to seat on the way the block providing adjustment means for the plate relative to the way.

4. A sine bar support, for a machine having a rotating chuck and a flat way parallel to the axis of rotation of the chuck, comprising:
   (a) a plate having a flat face parallel to the axis of rotation of the chuck,
   (b) a rail on the plate providing a machined surface against which a sine bar bears for orientation while located on the plate face, and
   (c) a riser block supporting the plate,
   (d) means pivotally and detachably connecting the block to the plate for movement selectively to different angular positions relative to the plate, and
   (e) a magnet mounted to and carried by the block, the magnet being movable selectively to different positions on a specific flat way on which it is supported, the magnet having a flat face parallel to the plate face and adapted to seat on the flat way.

5. In a taper and angle gauging assembly for a machine having a way parallel to a work axis of the machine:
   (a) a plate having a flat face parallel to the work axis of the machine,
   (b) a rail extending across the plate, the rail including an accurately machined surface.
   (c) a block attached to the plate, the block including a magnet having a face seating adjustably on the way to place the plate face parallel to the machine work axis and to adjust the plate relative to the way,
   (d) aligning means on the machine indicating in the rail surface relative to the machine work axis, the magnet being adjustably movable on the way to adjust the alignment of the rail surface, and
   (e) a gauge, including a sloping face, supported on the plate face and bearing operatively against the rail surface for orientation.

6. In a taper and angle gauging assembly for a lathe having a way parallel to the center line of the lathe bed, and a carriage movable parallel to the center line:
   (a) a plate having a flat face,
   (b) a rail extending across the plate, the rail including an accurately machined surface,
   (c) a block attached to the plate, the block including a magnet having a face seating adjustably on the way to place the plate face parallel to the center line of the lathe bed,
   (d) an alignment indicator mounted on the carriage for indicating in the rail surface relative to the center line of the lathe bed, the magnets being adjustably movable on the way to adjust the alignment of the rail surface, and
   (e) a gauge, including a sloping face, supported on the plate face and bearing operatively against the rail surface for orientation relative to the center line of the lathe bed, the alignment indicator being adapted to indicate in the gauge to condition the lathe for a particular angle relative to the center line of the lathe bed.

7. In a taper and angle gauging assembly for a lathe including a flat way parallel to the center line of the lathe bed, and a carriage movable parallel to the center line:
   (a) a plate having a flat face,
   (b) a rail extending across the plate, the rail including an accurately machined surface,
   (c) a block attached to the plate, the block including a magnet having a flat face parallel to the plate face, the magnet seating adjustably on the flat way to place the plate face parallel to the center line of the lathe bed,
   (d) an alignment indicator mounted on the carriage for indicating in the rail surface relative to the center line of the lathe bed, the magnets being adjustably movable on the way to adjust the alignment of the rail surface, and
   (e) a sine bar supported on the plate face and bearing operatively against the rail surface for orientation relative to the center line of the lathe bed, the alignment indicator being adapted to indicate in the sine bar to condition the lathe for a particular angle relative to the center line of the lathe bed.

8. A taper and angle gauging assembly as defined in claim 7, in which:
   (f) the block holds the plate at a convenient work height between the lathe centers, and the block is detachably secured to the plate and positioned to hold the rail surface either longitudinally parallel or transversely perpendicular to the center line of the lathe bed.

9. A taper and angle gauging assembly as defined in claim 8, in which:
   (g) the plate is squared with two pair of opposed parallel side margins, the rail surface being parallel to one pair of parallel side margins and perpendicular to the other pair, any one of said side margins being adapted for use to indicate in the rail surface by the alignment indicator.

References Cited

UNITED STATES PATENTS

| | | | |
|---|---|---|---|
| 1,476,573 | 12/1923 | Allen | 33—174 |
| 2,219,370 | 10/1940 | Pierce | 33 |
| 2,398,121 | 4/1946 | Silvermaster | 33—174 |
| 2,747,291 | 5/1956 | Snyder | 33 |
| 3,276,133 | 10/1966 | Nowjak | 33—174 |

FOREIGN PATENTS 546,009  6/1942  Great Britain.

SAMUEL S. MATTHEWS, *Primary Examiner.*